United States Patent Office 3,476,715
Patented Nov. 4, 1969

3,476,715
PROCESS FOR POLYMERIZING PROPIOLACTONES USING TERTIARY PHOSPHINE CATALYSTS
Philip Lyle Wagner, Waynesboro, Va., assignor to E. I. du Pont de Nemours and Company, Wilmington, Del., a corporation of Delaware
No Drawing. Filed June 1, 1966, Ser. No. 554,318
Int. Cl. C08g 17/017, 17/02
U.S. Cl. 260—78.3                                  9 Claims

ABSTRACT OF THE DISCLOSURE

A process for homo- or copolymerizing 2,2-disubstituted 3-propiolactone is disclosed using a tertiary phosphine of the formula

RR′R″P wherein R, R′ and R″ are hydrocarbyl radicals of from 1 to 12 carbon atoms and the hydrocarbyloxy, dihydrocarbylamino and dihydrocarbylphosphino derivatives thereof. The catalyst is mixed with the monomer and the resulting mixture is heated to a temperature in the range of about 50° to 300° C. until the desired degree of polymerization, e.g., film- or fiber-forming polymer, is obtained.

---

This invention relates to a process for preparing polymeric 2,2-disubstituted 3-propiolactones. More particularly, the invention relates to the use of a novel class of initiators for the preparation of the polymeric lactones.

Pivalolactone and other 2,2-disubstituted 3-propiolactones polymerize to form polyesters which can be extruded to form fibers valuable for the production of many textile materials. In particular, the fibers have been found superior to fibers of polyethylene terephthalate and other conventional polyesters for garments which can be laundered after they have been worn, dried quickly, and present a good appearance when worn again without any ironing being required.

Although the 2,3-disubstituted 3-propiolactones can be polymerized without the aid of a catalyst, this is accomplished only with difficulty. Unfortunately, materials such as antimony oxide, arsenic oxide, and tetrabutyl titanate usually employed as catalysts for preparing polyethylene terephthalate and other conventional polyesters are ineffective for preparing polyesters from the 2,3-disubstituted 3-propiolactones.

In accordance with the present invention, it has been found that tertiary phosphines of the formula

RR′R″P    (I)

wherein R, R′, and R″ are the same or different hydrocarbyl radicals or suitable derivatives thereof as defined below, are excellent initiators for the polymerization of 2,2-disubstituted 3-propiolactones.

More specifically described, the invention comprehends a nove process in which a 2,2-disubstituted 3-propiolactone having the formula

(II)

wherein Q and Q′ are the same or different alkyl radicals containing from 1 to 4 carbon atoms which may contain chlorine substituents and which may optionally be joined by a carbon-to-carbon bond to form an alicyclic ring, is mixed with a tertiary phosphine of the formula

RR′R″P wherein R, R′, and R″ are hydrocarbyl radicals or derivatives thereof as defined below; and the mixture is heated at a temperature in the range of about 50° to about 300° C. until the mixture has polymerized to form a polymeric 2,2-disubstituted 3-propiolactone. The amount of tertiary phosphine added is preferably in the range of about 0.001 to about 2 mols per 100 mols of lactone to be polymerized.

Simple mixing of the lactone and the tertiary phosphine is all that is required in some instances to effect polymerization, heat being evolved spontaneously within the mixture, slowly at first an dthen quite vigorously until full polymerization occurs. In such cases all the heat required to effect polymerization is supplied by the reaction mixture itself. In other instances, warming of the reaction mixture to about 50° C. may be necessary, after which vigorous spontaneous evolution of heat may occur or polymerization may be completed by continued external application of heat to maintain the mixture at a temperature of at least 50° C. A diluent may be added, and when this is done external application of heat to maintain the mixture at a temperature of at least 50° C. is usually required. The use of a diluent is especially desirable in instances in which the reaction would otherwise proceed quite violently, in order to minimize degradation of the polymer. Hexane, heptane, toluene, and other liquid hydrocarbons free from aliphatic unsaturation are preferred diluents, since they are solvents for the monomeric lactone but are non-solvents for the polymer; thus, the polymer precipitates once it is formed and is readily separated by filtration.

The radicals, R, R′, and R″, in the tertiary phosphine are preferably hydrocarbyl radicals of from 1 to about 12 carbon atoms and free from aliphatic unsaturation. The hydrocarbyl radicals may bear other substituents: thus, halogen atoms, hydrocarbyloxy radicals, dihydrocarbylamino radicals, or dihydrocarbylphosphino radicals may suitably be present as substituents. Preferably the substituents will contain no more than 12 carbon atoms. The tertiary phosphine may be symmetrical, with the three radicals R, R′, and R″ being identical; or it may be unsymmetrical, with the three radicals being different. Typical tertiary phosphines which may be employed in accordance with the present invention include triphenylphosphine (R=R′=R″=C₆H₅), tri(4 - chlorophenyl) phosphine (R=R′=R″=4-ClC₆H₄), tri-(3-methoxyphenyl)phosphine (R=R′=R″=3-CH₃OC₆H₄), tri-(2-tolyl) phosphine (R=R′=R″=2-CH₃C₆H₄), tri-(α-naphthyl) phosphine (R=R′=R″=α-C₁₀H₇), diphenyl-4-bromophenylphosphine (R=R′=C₆H₅, R″=4-BrC₆H₄), diphenyl-4-tolylphosphine (R=R′=C₆H₅,

R″=4-CH₃C₆H₄)

phenyl - 4 - tolyl-4-methoxyphenylphosphine (R=C₆H₅, R′=4-CH₃C₆H₄, R″=4-CH₃OC₆H₄),tris-2 - (dimethylaminomethylphenyl)phosphine, diphenyl - 4-(diphenylphosphinophenyl)phosphine, phenyldimethylphosphine, phenyldiethylphosphine, dimethyl-2-(dimethylphosphino) ethylphosphine, tributylphosphine, and trihexylphosphine.

In a preferred embodiment of the invention, the 2,2-disubstituted 3-propiolactone is mixed with 0.001 to 2 mol percent triphenylphosphine in the absence of solvent and heated to a temperature of at least 50° C. The mixture of lactone and triphenylphosphine has the surprising property of being relatively stable at room temperature (25° C.), so that it may be prepared and handled at room temperature for periods ranging from one hour up to several hours without undergoing polymerization. However, polymerization ensues when the mixture is heated to about 50° C.; at 60–70° C. the reaction becomes extremely vigorous. Moreover, the polymeric product has outstanding thermal stability, as compared with polymer prepared with the aid of a prior art catalyst such as triethylenediamine as described by Fischer et al. in French Patent 1,231,163.

The polymerization is believed to proceed by formation of a phosphobetaine intermediate. Thus, one molecule of triphenylphosphine (III) and one molecule of pivalolactone (IV) react to form a molecule of triphenylphosphoniopivalate (V), which then reacts sequently with additional molecules of pivalolactone to form a molecule of polyivalolactone (VI) with a triphenylphosphonium radical as an end-chain unit:

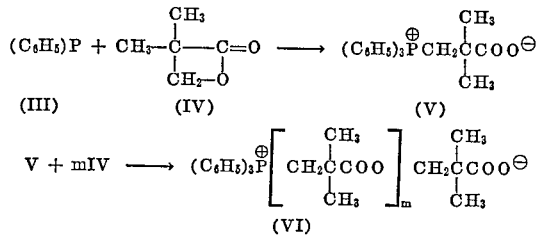

Owing to chain transfer and other possible reaction mechanisms, a portion of the product may comprise polymer molecules not containing triphenylphosphonium radicals as end-chain units.

In one embodiment of the invention, the process of the invention is carried out in two stages by forming a phosphobetaine compound having the formula of a lactone—tertiary phosphine reaction product and then employing the phosphobetaine as an initiator for the polymerization of a 2,2-disubstituted 3-propiolactone.

Typical 2,2-disubstituted 3-propiolactones which may be employed in accordance with the present invention include pivalolactone ($Q=Q'=CH_3$), 2,2-diethyl-3-propiolactone ($Q=Q'=CH_2CH_3$), 2-methyl-2-chloromethyl-3-propiolactone ($Q=CH_3$, $Q'=ClCH_2$), 2,2-bis(chloromethyl)-3-propiolactone ($Q=Q'=ClCH_2$), 2-methyl-2-ethyl-3-propiolactone ($Q=CH_3$, $Q'=CH_2CH_3$), 2,2-dipropyl-3-propiolactone ($Q=Q'=CH_2CH_2CH_3$), 2,2-dibutyl-3-propiolactone ($Q=Q'=CH_2CH_2CH_2CH_3$), and 2,2-pentamethylene-3-propiolactone $$(Q=Q'=CH_2CH_2CH_2CH_2CH_2)$$

Copolymeric components may also be added, including ester-forming monomers such as carbonates, other lactones, and unsaturated compounds such as methyl vinyl sulfone. Preferably, at least 50% of the material to be polymerized comprises the 2,2-disubstituted 3-propiolactone, both on a mol percentage and weight percentage basis.

Although the homopolymer prepared by the polymerization of pivalolactone is designated herein simply as polypivalolactone, the polymer can also be named by such alternative names of poly(oxacarbonyl-1,1-dimethyl-dimethylene), multi(oxycarbonyl - 1,1 - dimethyldimethylene), and poly(hydroxypivalic acid). Similarly, the polymer obtained from 2-chloromethyl-2-methyl-3-propiolactone may be designated as poly(2-chloromethyl-2-methyl-3-propiolactone), as poly(oxycarbonyl-1-chloromethyl-1-methyl-dimethylene), or by various other alternative names.

The following examples will further illustrate the invention, although they are not intended as limitative.

The term "inherent viscosity," as used herein, is defined as the polymer property determined in accordance with the following relationship:

wherein the relative viscosity, $\eta_{rel}$, is calculated by dividing the flow time in a capillary viscometer of a dilute solution of the polymer by the flow time for the pure solvent, trifluoroacetic acid. The concentration (c) used in the examples is 0.5 gram of polymer per 100 ml. of solution and a temperature of 30° C. is employed. It is desirable that the polymer have an inherent viscosity of at least about 0.5 for preparation of films. For the production of fibers an inherent viscosity of at least about 0.75 is desirable.

EXAMPLE 1

Preparation of polypivalolactone using triphenylphosphine

To 20 g. (0.2 mol) of pivalolactone in a polymer tube is added 0.20 g. (0.00076 mol) of triphenylphosphine. The triphenylphosphine dissolves readily to form a clear solution.

The polymer tube is placed on a steam bath. Upon reaching a temperature of about 60° C., a vigorous exothermic reaction occurs. Heating is continued for approximately twenty minutes. A yield of 19.1 grams of the product, polypivalolactone, is obtained. It has an inherent viscosity of 1.32. A film melt pressed from the polymer is found to be clear and creasable.

The example is repeated, using a solution of 25 g. (0.25 mol) of pivalolactone with 0.05 g. (0.00019 mol) of triphenylphosphine (0.2 weight percent, based on the pivalolactone). The polymer obtained upon polymerization in the steam bath has an inherent viscosity of 3.0.

In a control experiment, pure pivalolactone is heated in a polymer tube on the steam bath in the absence of triphenylphosphine. After the tube has been heated overnight, its contents are found to consist of unreacted pivalolactone containing about 2% by weight of polypivalolactone in suspension.

The following example illustrates the stability of solutions triphenylphosphine in pivalolactone at room temperature for periods up to several hours. Because of the stability of such solutions, the starting material can be mixed and handled with facility prior to polymerization, which can be induced readily by heating the solutions to 50° C. or slightly higher.

EXAMPLE 2

Stability of pivalolactine-triphenylphosphine solution

A solution of 1% by weight of triphenylphospine in pivalolactone (0.38 mol of triphenyl phosphine per 100 mols of pivalolactone) is prepared and allowed to stand at room temperature (approximately 25° C.). The solution is observed at intervals, and it is noted that the solution remains clear for the first three hours, with no increase in viscosity or temperature. After 200 minutes, it is noted that the solution becomes cloudy. Upon standing overnight, the mixture polymerizes and solidifies (after more than 400 minutes), forming a smooth plug having the shape of the interior of the vessel.

In another run, a solution of 5% by weight of triphenylphosphine in pivalolactone is prepared and allowed to stand at room temperature. It is observed that no polymerization occurs during the first hour, and that polymerization occurs only very slowly thereafter.

For comparative purposes, a stability test is performed with the prior art catalyst, triethylenediamine, disclosed by Fischer et al. in French Patent 1,231,163. When a solution of 1% by weight of triethylenediamine in pivalolactone is prepared, the solution is initially clear but becomes cloudy after only 5 minutes. After 7 minutes, it is observed that the solution is quite viscous and that the vessel is warm to the touch. Twelve minutes after the solution is prepared, polymerization becomes violent, with copious formation of bubbles and flowing of the polymer from the vessel.

EXAMPLE 3

Fibers of polypivalolactone prepared with triphenylphosphine

Following the procedure of Example 1, a solution of 25 g. (0.25 mol) of pivalolactone and 0.05 g. 0.00019 mol) of triphenylphosphine is polymerized by heating it on the steam bath for approximately twenty minutes. The product, polypivalolactone, is broken up, extracted with acetone, and dried. It has an inherent viscosity of 1.60. It is readily melt spun at 291° C. through an 0.23 mm. (9 mil) orifice at 59.1 kg./cm.² (840 p.s.i.). The extruded filament is quenched in ice water 25.4 cm. (10 inches) below the spinneret and wound up at 274 meters per minute (300 yards per minute). A sample of the spun fiber is found to have an inherent viscosity of 1.66, illustrating the high degree of stability of the polymer. The spun fiber, plied to a 10-filament yarn, is readily drawn 1.6X over a curved hot plate maintained at 115° C. to form a tenacious yarn.

The example is repeated, employing a solution of 20 g. (0.20 mol) of pivalolactone and 0.001 g. (0.000004 mol) of triphenylphosphine as the polymerization mixture. Polypivalolactone is obtained in a yield of 18.6 g. The inherent viscosity is 1.72. Fibers spun from the polymer have an inherent viscosity of 1.81, illustrating the high degree of stability of the polymer.

EXAMPLE 4

Stability of polypivalolactone prepared with triphenylphosphine

A solution of 25 g. (0.25 mol) of pivalolactone and 0.0125 g. (0.000048 mol) of triphenylphosphine is prepared in a polymer tube, after which the tube is sealed. The sealed tube is then placed in an oil bath maintained at 250° C. After 20 minutes, the tube is removed from the oil bath and allowed to cool. The product, polypivalolactone, has an inherent viscosity of 2.33. This product is designated below as the "test sample."

For the purpose of evaluating the stability of the test sample, a "control sample" of polypivalolactone is prepared by refluxing a mixture of 0.25 g. of triethylenediamine, 25 g. of pivalolactone, 100 ml. of hexane, and 0.1 ml. of ethanol for 1.5 hours. The resulting polypivalolactone polymer is recovered by filtration and dried at 100° C. under vacuum. The inherent viscosity of this control sample is found to be 3.62.

The relative stability of the test sample and control sample of polypivalolactone is then determined by heating the samples at 265° C. The results are given below:

|  | Decrease in Inherent Viscosity Upon Heating at 265° C. | Heating Time |
|---|---|---|
| Test Sample | 0.49 | 25 min. |
| Control Sample | 1.79 | 20 min. |

EXAMPLE 5

Preparation of polypivalolactone using tris-2-(dimethylaminomethylphenyl)phosphine To 25 ml. (24.5 g.; 0.245 mol) of pivalolactone in a test tube is added 200 microliters of 0.51 molar tris-2-(dimethylaminomethylphenyl)phosphine in benzene. The tube is heated in a bath maintained at 80° C. The temperature of the mixture increases rapidly, and after four minutes it begins to boil. The product, polypivalolactone, has an inherent viscosity of 4.64.

In a similar experiment, the amount of initiator added is reduced from 590 microliters to 147 microliters of the 0.51 molar solution. The resulting polymer has an inherent viscosity of 4.96.

EXAMPLE 6

Preparation of polypivalolactone using diphenyl-4-(diphenylphosphinophenyl)phosphine To 25 ml. (24.5 g.; 0.245 mol) of pivalolactone in a test tube is added 590 microliters of a 0.17 molar solution of diphenyl-4-(diphenylphosphinophenyl)phosphine in benzene. The tube is placed in a 90° C. water bath. After two minutes, the mixture begins to boil. The product, polypivalolactone, has an inherent viscosity of 4.33.

In a similar experiment, the amount of iniatiator added is reduced from 590 microliters to 14 microliters of the 0.17 molar solution. The resulting product has an inherent viscosity of 4.56.

EXAMPLE 7

Preparation of polypivalolactone using dimethyl-2-(dimethylphosphino)ethylphosphine To 25 ml. (24.5 g.; 0.245 mol) of pivalolactone in a test tube is added 147 microliters of a 0.68 molar solution of dimethyl-2-(dimethylphosphino)ethylphosphine in toluene. The tube is placed in an 80° C. water bath, whereupon the mixture begins to boil within three minutes. The product, polypivalolactone, exhibits an inherent viscosity of 1.42.

In a similar experiment, the amount of initiator solution is reduced from 147 microliters to 15 microliters of the 0.68 molar solution. The resulting polymer has an inherent viscosity of 3.17.

EXAMPLE 8

Preparation of polypivalolactone using phenyldimethylphosphine

To 25 ml. (24.5 g.; 0.245 mol) of pivalolactone in a test tube is added 131 microliters of a 0.76 molar solution of phenyldimethylphosphine in toluene. No external heat is applied; however, the mixture grows warm and, after 40 minutes, begins to boil. The product, polypivalolactone, has an inherent viscosity of 1.53.

In a similar experiment, the amount of initiator is reduced from 131 microliters to 13 microliters of 0.76 molar solution. In this run, the tube containing the mixture is placed in an 80° C. water bath. The inherent viscosity of the product is 3.63.

EXAMPLE 9

Preparation of polypivalolactone using tributylphosphine

To 20 ml. (19.6 g.; 0.196 mol) of pivalolactone in a test tube is added 0.1 ml. (0.08 g.; 0.0004 mol) of tributylphosphine. No external heat is applied; however, the mixture grows warm and, after 5 minutes, begins to boil. The product, polypivalolactone, has an inherent viscosity of 2.1.

EXAMPLE 10

Solution polymerization of pivalolactone with tributylphosphine

Fifty (50) g. (0.5 mol) of pivalolactone is added to a solution of 0.22 ml. (0.2 g.; 0.001 mol) of tributylphosphine in 250 ml. of hexane. The mixture is stirred and refluxed for 3.25 hours, after which the product, polypivalolactone, is recovered by filtration. It has an inherent viscosity of 3.8. The yield is 93% of theory.

EXAMPLE 11

Solution polymerization of pivalolactone with triphenylphosphine

Twenty-five (25) g. (0.25 mol) of pivalolactone is added to a solution of 0.3 g. (0.0011 mol) of triphenylphosphine in 250 ml. of hexane. The mixture is refluxed for 4 hours, after which the product, polypivalolactone, is recovered by filtration. The yield is 12.8 g., and the inherent viscosity of the polymer is 2.26.

Twenty-five g. (0.25 mol) of pivalolactone is added to a solution of 0.1 g. (0.0004 mol) of triphenylphosphine in 250 ml. of anhydrous acetonitrile. After refluxing for four hours, 18.8 g. of polypivalolactone is recovered by filtration. The inherent viscosity is 1.34.

EXAMPLE 12

Copolyester derived from pivalolactone and ethylene carbonate with triphenylphosphine A solution of 20 g. (0.2 mol) of pivalolactone, 0.05 g. (0.00019 mol) of triphenylphosphine, and 1.0 g. (0.0085 mol) of ethylene carbonate is prepared in a polymer tube. Upon heating the polymer tube in a steam bath, vigorous polymerization occurs. The product, a copolyester of pivalolactone and ethylene carbonate, is a white polymer plug which is broken up, extracted with hot acetone, and dried under vacuum. The inherent viscosity of the copolyester is 1.22. The copolyester so prepared has a melting point of 237° C., as compared with a melting point of 244° C. obtained on the same melting-point-determination apparatus with a sample of pure polypivalolactone obtained by polymerizing a sample of pure (catalyst-free) pivalolactone at 197° C. until an inherent viscosity of 1.01 is obtained.

A sample of the copolyester is melt spun at 255° C. through an 0.23 mm. (9 mil) orifice at a pressure of 33.8 kg./cm.$^2$ (480 p.s.i.). The extruded filament is quenched in ice water and wound at 400 yards per minute. The fiber sample is plied to seven filaments and drawn 2× at 120° C. on a hot plate to form a tenacious yarn.

EXAMPLE 13

Copolymer derived from pivalolactone and methyl vinyl sulfone with triphenylphosphine A solution of 25 g. (0.25 mol) of pivalolactone, 0.05 g. (0.00019 mol) of triphenylphosphine, and 2.0 g. (0.019 mol) of methyl vinyl sulfone is prepared in a polymer tube. Upon heating in the steam bath, the mixture polymerizes readily to form a copolymer of polypivalolactone and methyl vinyl sulfone. After the polymer plug is broken up, extracted three times with acetone, and dried overnight under vacuum at 70° C., the yield is 23.3 g. of polymer having an inherent viscosity of 1.19. Analytical values for sulfur content average 0.27 weight percent, indicating that the polymer contains about 1 mol percent repeating structural units derived from the methyl vinyl sulfone.

EXAMPLE 14

Copolymer derived from pivalolactone and bis(chloromethyl)oxetane with triphenylphosphine A solution of 25 g. (0.25 mol) of pivalolactone, 0.05 g. (0.00019 mol) of triphenylphosphine, and 2.5 g. (0.016 mol) of bis(chloromethyl)oxetane is prepared in a polymer tube. Upon heating in the steam bath, the mixture polymerizes vigorously to form a copolyester of polypivalolactone and bis(chloromethyl)oxetane. The polymer plug is extracted with hot acetone, dried, dissolved in trifluoroacetic acid, reprecipitated in water, washed and dried at 100° C. under vacuum overnight. The inherent viscosity is 0.43 and the yield is 21.5 g., measured after the acetone extraction step. The reprecipitated polymer yields analytical values for chlorine content averaging 0.87%, indicating that the polymer contains about 1.2 mol percent repeating structural units derived from the bis(chloromethyl)oxetane.

The tertiary phosphines are surprisingly superior to the secondary phosphines as initiators for the polymerization of 2,2-disubstituted 3-propiolactones. Not only is the time required for reaction markedly lower, but the polymer obtained with tertiary phosphines has a much higher molecular weight than polymer obtained using secondary phosphines as initiators. The following example illustrates this.

EXAMPLE 15

Polymerization of pivalolactone: comparison of triphenylphosphine with diphenylphosphine In a series of experiments, test tubes are charged with pivalolactone together with the amount (calculated as wt. percent, based on pivalolactone) of triphenylphosphine indicated in the table below and the tubes are then heated on a steam bath. The molar ratio of initiator to lactone, time required for reaction to begin (taken as the time required for the reaction mixture to commence boiling), and inherent viscosity of the product, polypivalolactone, are given in the table. A simultaneous series of experiments is run under the same reaction conditions, using diphenylphosphine as the initiator at the same molar concentrations, and the results from this series of experiments are also shown in the table.

| Initiator | Weight Percent | Mols Initiator Per Mol of Lactone | Time for Reaction to Begin (Min.) | Polymer Inserent Viscosity |
|---|---|---|---|---|
| Triphenylphosphine | 2.7 | 0.0103 | 1 | 2.62 |
| Diphenylphosphine | 1.9 | 0.0103 | 18 | 0.57 |
| Triphenylphosphine | 1.4 | 0.0054 | 2 | 2.67 |
| Diphenylphosphine | 1.0 | 0.0054 | 18 | 0.78 |
| Triphenylphosphine | 0.71 | 0.0027 | 2.5 | 2.08 |
| Diphenylphosphine | 0.51 | 0.0028 | 66 | 1.06 |
| Triphenylphosphine | 0.16 | 0.0006 | 6 | 2.97 |
| Diphenylphosphine | 0.11 | 0.0006 | (¹) | 1.81 |

¹ Solid in 360 min.

What is claimed is:
1. The process for polymerizing a 2,2-disubstituted 3-propiolactone having the formula

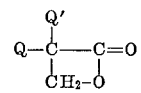

wherein Q and Q' are alkyl radicals of from 1 to 4 carbon atoms and chloro derivatives thereof and when joined form an alicyclic ring, comprising mixing said lactone with a tertiary phosphine selected from the group consisting of: tris-2-(dimethylaminomethylphenyl)phosphine, diphenyl-4-(diphenylphosinophenyl)phosphine, and dimethyl-2-(dimethylphospino)ethylphosphine and heating the mixture at a temperature in the range of about 50° to about 300° until the lactone has polymerized to form polymer having an inherent viscosity of at least about 0.5.

2. The process of claim 1 in which the amount of tertiary phosphine added is in the range of about 0.001 to about 2 mols per 100 mols of lactone to be polymerized.

3. The process of claim 1 wherein the lactone is copolymerized with up to 50% by weight of a comonomer.

4. A process for polymerizing pivalolactone comprising mixing said lactone with a tertiary phosphine selected from the group consisting of: tris-2-(dimethylaminomethylphenyl)phosphine, diphenyl-4-(diphenylphospinophenyl)phosphine, and dimethyl-2-(dimethylphosphino)ethylphosphine and heating the mixture at a temperature in the range of about 50° to about 300° until polypivalolactone is formed having an inherent viscosity of at least about 0.5.

5. The process of claim 4 wherein the tertiary phosphine is tris-2-(dimethylaminomethylphenyl)phosphine.

6. The process of claim 4 wherein the tertiary phosphine is diphenyl-4-(diphenylphosphinophenyl)phosphine.

7. The process of claim 4 wherein the tertiary phosphine is dimethyl-2-(dimethylphosphino)ethylphosphine.

8. The process of claim 3 wherein pivalolactone is copolymerized with methyl vinyl sulfone.

9. The process of claim 3 wherein pivalolactone is copolymerized with bis(chloromethyl)-oxetane.

References Cited

UNITED STATES PATENTS 3,268,486  8/1966  Klootwijk _____ 260—78.3
3,140,274  7/1964  Cantor et al. _____ 260—78.3

FOREIGN PATENTS 766,347  1/1957  Great Britain.

WILLIAM H. SHORT, Primary Examiner
E. NEILSEN, Assistant Examiner

U.S. Cl. X.R.
260—2, 79.7